United States Patent [19]

Ito et al.

[11] Patent Number: 4,473,055
[45] Date of Patent: Sep. 25, 1984

[54] METHOD AND APPARATUS FOR CONTROLLING THE AMOUNT OF INTAKE AIR IN AN INTERNAL-COMBUSTION ENGINE HAVING A SUPERCHARGER

[75] Inventors: Yoshiyasu Ito; Yuji Takeda; Toshio Suematsu; Katsushi Anzai, all of Toyota, Japan

[73] Assignee: Toyota Jidosha Kabushiki Kaisha, Toyota, Japan

[21] Appl. No.: 507,000

[22] Filed: Jun. 23, 1983

[30] Foreign Application Priority Data

Mar. 18, 1983 [JP] Japan .................. 58-044333

[51] Int. Cl.³ .................. F02D 23/00; F02B 37/12
[52] U.S. Cl. .................. 123/564; 60/600; 60/611; 123/585
[58] Field of Search .................. 123/339, 34 C, 564, 123/585, 58 E, 179 A, 179 B; 60/597, 59 E, 600, 605, 611

[56] References Cited

U.S. PATENT DOCUMENTS

| 4,227,372 | 10/1980 | Kakimoto et al. | 60/611 |
| 4,400,944 | 8/1983 | Iwamoto et al. | 60/605 |

FOREIGN PATENT DOCUMENTS

| 140533 | 8/1982 | Japan | 60/600 |
| 2054739 | 2/1981 | United Kingdom | 60/611 |
| 2083135 | 3/1982 | United Kingdom | 60/600 |

Primary Examiner—William A. Cuchlinski, Jr.
Attorney, Agent, or Firm—Finnegan, Henderson, Farabow, Garrett & Dunner

[57] ABSTRACT

In an internal-combustion engine having a supercharger and an air-bypass passage for controlling the idle speed, when the engine is being cranked, the air-bypass passage is completely open. When the engine is not being cranked and the supercharger is operating, the air-bypass passage is completely closed. Further, when the engine is not being cranked and the supercharger is not operating, the opening of the air-bypass passage is adjusted in accordance with predetermined operating parameters.

4 Claims, 5 Drawing Figures

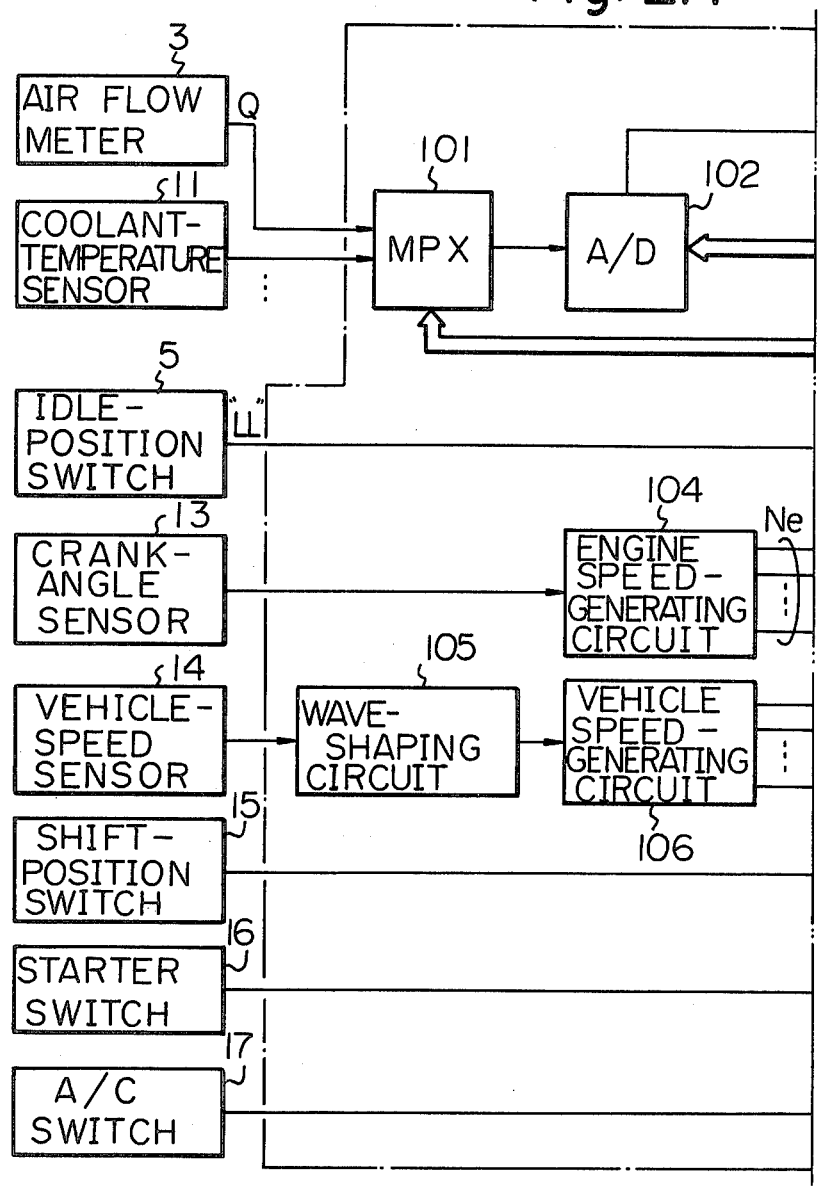

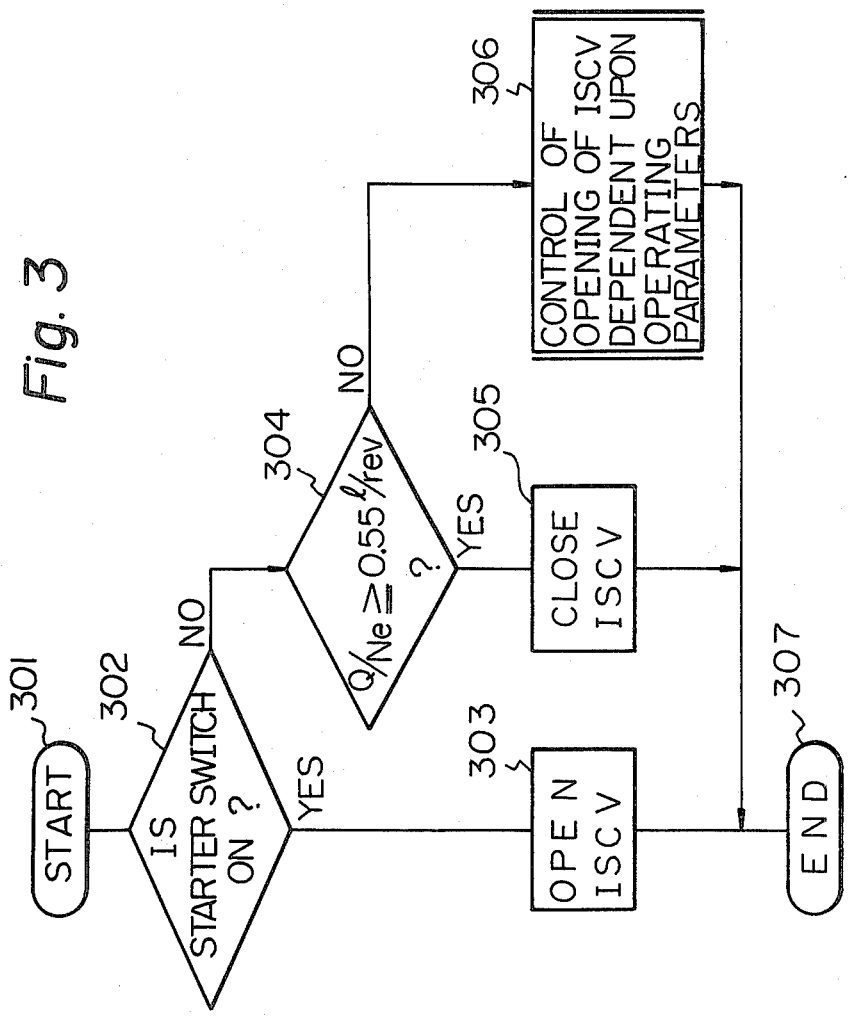

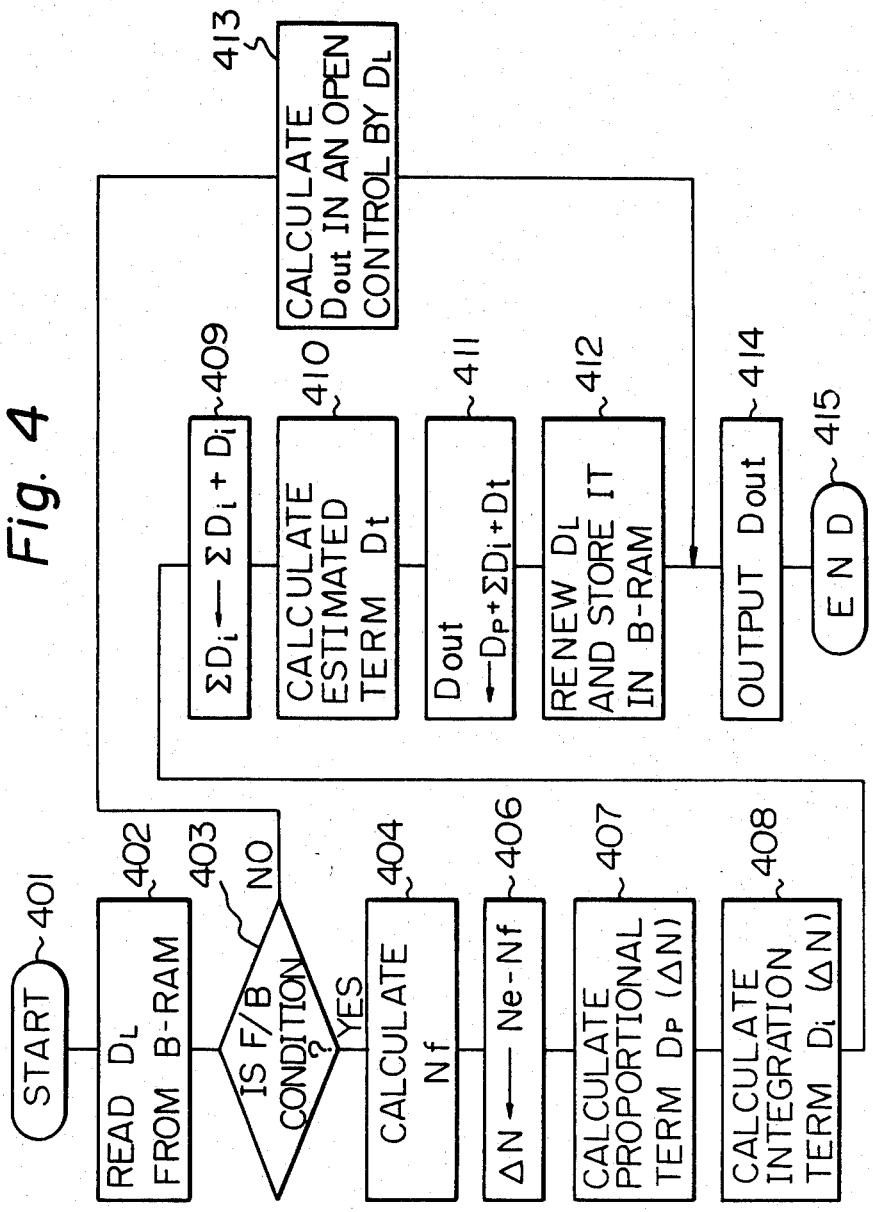

METHOD AND APPARATUS FOR CONTROLLING THE AMOUNT OF INTAKE AIR IN AN INTERNAL-COMBUSTION ENGINE HAVING A SUPERCHARGER

BACKGROUND OF THE INVENTION

1. Field of the Invention

The present invention relates to a method and apparatus for controlling the amount of intake air in an internal-combustion engine having a supercharger and also having an idle-speed control unit.

2. Description of the Prior Art

Generally, in order to control the rotational speed of an engine when the throttle valve is in an idle position, i.e., in order to bring the actual idle speed of the engine to a desired idle speed, an air-bypass passage connecting the upstream side of the throttle valve to the downstream side thereof is provided in an intake-air passage of the engine. In addition, a control valve is provided in the air-bypass passage so as to control the rate of air flowing therethrough. In a closed loop control, i.e., in a feedback control for controlling the actual idle speed, the opening of the control valve is controlled dependent upon the difference between the actual idle speed and the desired idle speed so that the former conforms with the latter.

Note that if the operating condition does not satisfy the feedback control condition, the opening of the control valve is set at a so-called learning value calculated during the feedback control operation. As a result, when the operating condition again satisfies the feedback condition, control of the idle speed smoothly returns to a feedback control state.

On the other hand, in an internal-combustion engine having a supercharger, since the intake air is forcibly pressed by the exhaust-gas energy and is then supplied to the combustion chamber of the engine, the pressure of the intake-air passage at the downstream of the throttle valve becomes higher than the atmospheric pressure when the load of the engine increases. As a result, in the air-bypass passage, the pressure at the downstream side of the control valve becomes higher than that at the upstream side thereof so that the balance of pressure is reversed. Therefore, when the opening of the control valve of the air-bypass passage is set at the above-mentioned learning value, the air of the intake-air passage at the downstream side of the throttle valve may leak out through the air-bypass passage due to the opening of the control valve. Further, in this case, since oil which leaks out of the bearings of the turbine of the supercharger passes through the control valve, this valve may be contaminated by the leaked oil.

SUMMARY OF THE INVENTION

It is an object of the present invention to provide an internal-combustion engine having a supercharger and an air-bypass passage for controlling the idle engine speed, in which engine intake-air leakage is reduced and oil-leakage contamination of the control valve installed in the air-bypass passage is diminished.

It is another object of the present invention to improve the starting characteristics of the above-mentioned engine.

According to the present invention, when the engine is being cranked, the air-bypass passage is completely open so as to increase the intake-air amount. Thus, the starting characteristics are improved. In addition, when the engine is not being cranked and the supercharger is operating, the air-bypass passage is completely closed so as to prevent the reverse flow of air through the air-bypass passage. Further, when the engine is not being cranked and the supercharger is not operating, the opening of the air-bypass passage is adjusted dependent upon predetermined operating parameters.

BRIEF DESCRIPTION OF THE DRAWINGS

The present invention will be more clearly understood from the description as set forth below with reference to the accompanying drawings, wherein:

FIGS. 2A and 2B are a detailed block diagram of the control circuit of FIG. 1;

FIG. 3 is a flow chart illustrating the operation of the control circuit of FIG. 1; and FIG. 4 is a detailed flow chart of step 406 of FIG. 3.

DESCRIPTION OF THE PREFERRED EMBODIMENTS

Figure 1:
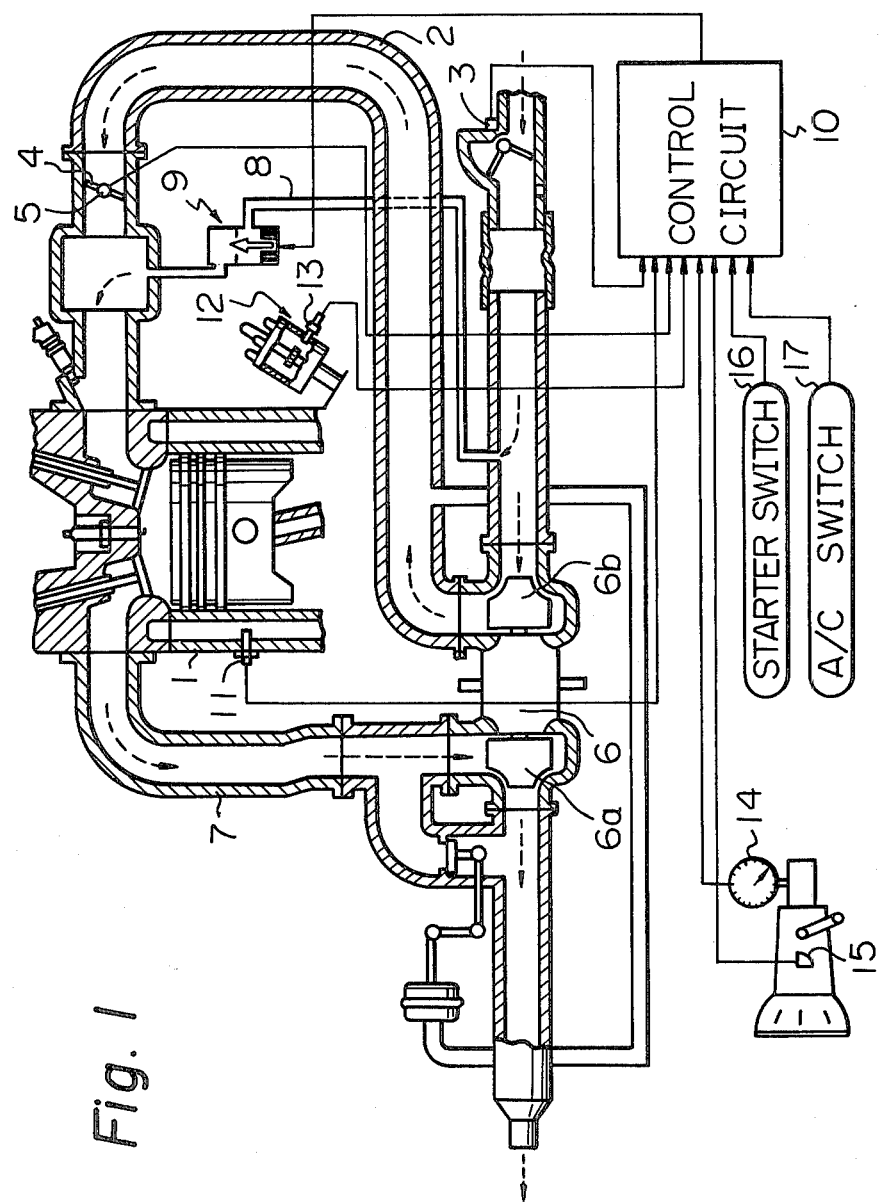
FIG. 1 is a schematic diagram of an internal-combustion engine according to the present invention.

In FIG. 1, reference numeral 1 designates a known four-cycle spark ignition engine disposed in an automotive vehicle. In an intake-air passage 2 of the engine 1, a potentiometer-type airflow meter 3 is provided for detecting the amount of air taken into the engine 1 to generate an analog voltage signal in proportion to the amount of air flowing therethrough. There is also provided at the downstream side of the intake-air passage 2 a throttle valve 4 which has a throttle-position sensor, i.e., an idle-position switch 5, at the shaft thereof. This idle-position switch 5 detects whether or not the throttle valve 4 is completely closed, i.e., whether or not the throttle valve 4 is in the idle position.

Reference numeral 6 designates a supercharger which comprises a turbine 6a, driven by the gas energy exhausted from an exhaust-gas passage 7, and a blow 6b, connected to the shaft of the turbine 6a. Note that the blower 6b is located in the intake-air passage 2 between the airflow meter 3 and the throttle valve 4.

An air-bypass passage 8 is provided for bypassing the throttle valve 4. That is, the air-bypass passage 8 connects the upstream side of the throttle valve 4 to the downstream side thereof. Disposed in the air-bypass passage 8 is a control valve 9 for controlling the rate of air flowing through the air-bypass passage 8. The control valve 9 is called an idle-speed control valve (ISCV).

Disposed in the water jacket of the cylinder block of the engine 1 is a thermistor-type coolant-temperature sensor 11 which detects the engine-coolant temperature to generate an analog voltage corresponding to the coolant temperature.

Disposed in a distributor 12 is a crank-angle sensor 13 which generates an angle-position signal at every predetermined crank angle (CA), such as 30° CA, of the crankshaft (not shown) of the engine 1.

Reference numeral 14 designates a vehicle-speed sensor which is, for example, comprised of a lead switch and a permanent magnet. In this case, when the permanent magnet is rotated by a speed-meter cable (not shown), the lead switch is switched on and off so as to generate a pulse-shaped signal which has a frequency in proportion to the velocity of the vehicle in which the engine 1 is disposed.

Reference numeral 15 designates a shift-position switch which operates in response to a state where the automatic transmission is shifted to the drive range (D range), 16 designates a starter switch which operates in response to a state where the engine 1 is being cranked, and 17 designates an air conditioner switch which operates in response to a state where the air conditioner is operated.

Reference numeral 10 designates a control circuit which responds to the signals of the airflow meter 3, the coolant-temperature sensor 11, the idle-position switch 5, the crank-angle sensor 13, the vehicle-speed sensor 14, the shift-position switch 15, and the air conditioner switch 17 to control the ISCV 9. Note that the control circuit 10 is comprised of, for example, a microcomputer.

Figure 2B:
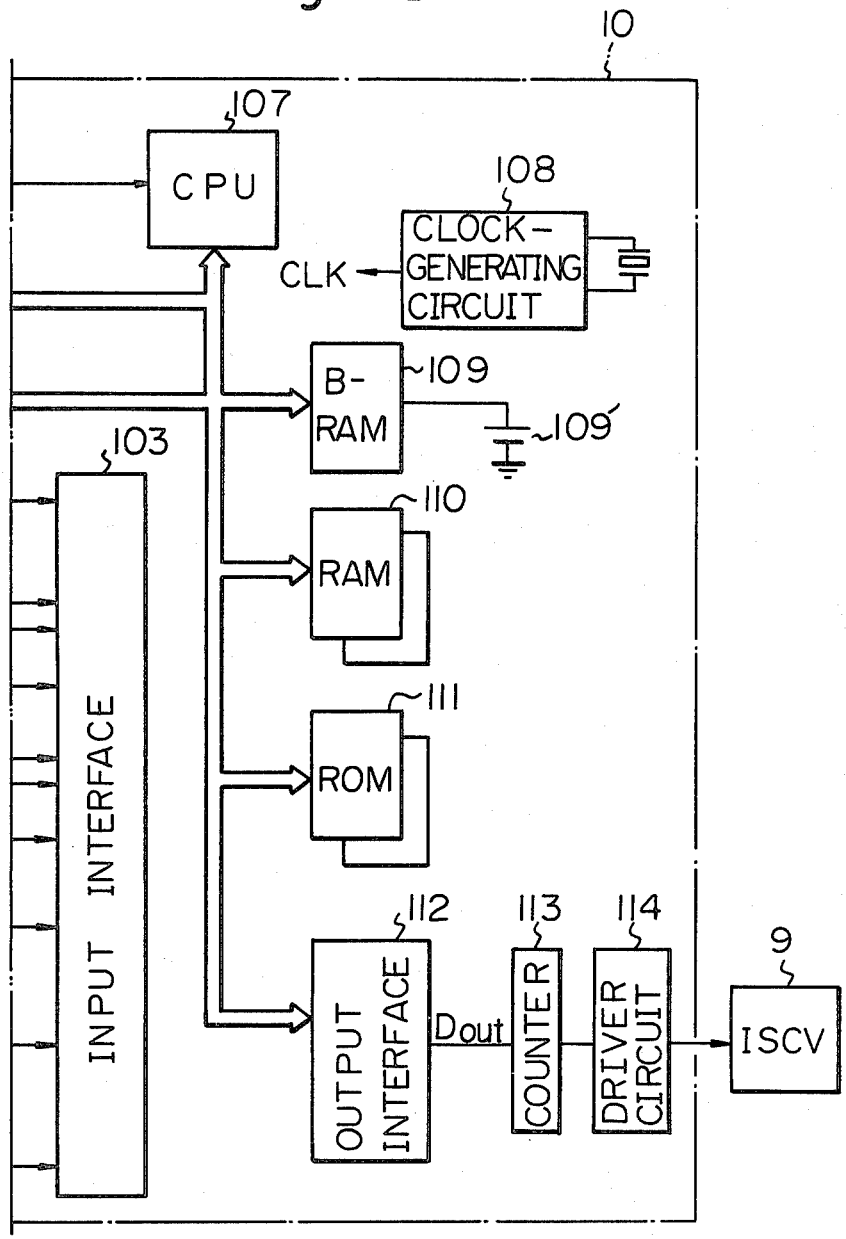

The control circuit 10 is explained in more detail with reference to FIG. 2. In FIG. 2, each analog signal of the airflow meter 3 and the coolant-temperature sensor 11 is supplied via a multiplexer 101 to an analog/digital (A/D) converter 102. That is, the analog signals Q and THW of the airflow meter 3 and the coolant-temperature sensor 11, respectively, are selected by the multiplexer 101, which is controlled by a central processing unit (CPU) 107, and the selected signals are supplied to the A/D converter 102. The A/D converter 102 subjects each analog signal of the airflow meter 3 and the coolant-temperature sensor 11 to A/D conversion by using a clock signal CLK from a clock-generating circuit 108. After each A/D conversion is completed, the A/D converter 102 transmits an interrupt-request signal to the CPU 107. As a result, in an interrupt routine, the CPU 107 successively stores each new piece of data of the airflow meter 3 and the coolant-temperature sensor 11 in predetermined areas of a random-access memory (RAM) 110.

The digital output signal "LL" of the idle-position switch 5 is supplied directly to a predetermined position of an input interface 103.

The pulse-shaped signal of the crank-angle sensor 13 is supplied via an engine speed-generating circuit 104 to predetermined positions of the input interface 103. The engine speed-generating circuit 104 comprises a gate, the on and off of which is controlled at every 30° CA, and a counter for counting the number of pulses of the clock signal CLK of the clock-generating circuit 108 when the gate is open. Thus, the engine speed-generating circuit 104 generates a binary-code signal which has a value inversely proportional to the rotational speed $N_e$ of the engine 1.

The digital output signal of the vehicle-speed sensor 14 is supplied via a wave-shaping circuit 105 and a vehicle speed-generating circuit 106 to predetermined positions of the input interface 103. The wave-shaping circuit 105 converts the output signal of the vehicle-speed sensor 14 into a rectangular signal which is transmitted to the vehicle speed-generating circuit 106. The vehicle speed-generating circuit 106 is comprised, for example, of a flip-flop, a gate, and a counter. That is, the flip-flop is set and reset alternately by the rectangular signal of the wave-shaping circuit 105 so that the gate is open only when the flip-flop is being set or reset. The counter counts the number of pulses of the clock signal CLK of the clock-generating circuit 108. Therefore, the counter generates a binary-code signal which has a value inversely proportional to the frequency of the rectangular signal, i.e., to the vehicle speed.

Reference numeral 109 designates a backup random-access memory (B-RAM) to which an auxiliary power supply 109' is applied. Therefore, even when the ignition switch (not shown) is turned off so that the power supply for the entire control circuit 10 is turned off, the contents of the B-RAM 109 are never erased. Thus, the B-RAM 109 is helpful in storing specified data, such as learning data, prepared for the next operation.

A read-only memory (ROM) 11 stores programs such as a main routine, a fuel-injection-amount calculating subroutine, an ignition timing-calculating subroutine, and the like and also stores various kinds of fixed data, i.e., constants and map data.

The CPU 107 sets duty-ratio data $D_{out}$ via an output interface 112 in a down counter 113. Note that the duty-ratio data $D_{out}$ is calculated by a routine explained in detail later. After the down counter 113 receives an operation-initializing signal from the CPU 107 at every predetermined time period, the down counter 113 counts the number of pulses of the clock signal CLK. As a result, a driver circuit 114 activates the ISCV 9 from the time when the above-mentioned operation signal is generated from the CPU 107 to the time when the content of the down counter 113 becomes zero. Thus, the ISCV 9 is controlled by the duty-ratio dependent upon the data $D_{out}$ and, accordingly, the intake-air amount of the air-bypass passage 8 is also controlled dependent upon the data $D_{out}$.

The operation of the circuit of FIG. 2 is now explained with reference to FIG. 3. The flow chart of FIG. 3 represents an interrupt routine started at every predetermined time period or one part of the main routine.

When control is transferred from a start step 301 to a step 302, the CPU 107 determines whether or not the starter switch 16 is turned on, i.e., whether or not the engine 1 is being cranked. When the engine 1 is being cranked, control is transferred to step 303, but when the engine 1 is not being cranked, control is transferred to step 304.

At step 303, the CPU 107 sets the output data $D_{out}$ corresponding to the duty-ratio 100% in the down counter 113. As a result, the ISCV 9 is completely open. Thus, when the engine 1 is being cranked, the ISCV 9 is completely open so as to increase the intake-air amount.

At step 304, the CPU 107 reads the intake-air amount data Q and the engine speed data $N_e$ from the RAM 110 and then determines whether or not $Q/N_e \geq 0.55$ l/rev. Here, assume that an affirmative answer of determination at step 304 means that the supercharger 6 is operating and that a negative answer of determination at step 304 means that the supercharger 6 is not operating. Thus, when the determination at step 304 is YES, control is transferred to step 305 while when the determination at step 304 is NO, control is transferred to step 306.

Note that other values can be used as the above-mentioned value 0.55 l/rev.

At step 305, the CPU 107 sets the output data $D_{out}$ corresponding to the duty-ratio 0% in the down counter 113. As a result, the ISCV 9 is completely closed so that there is a reverse flow of air in the air-bypass passage 8.

At step 306, the CPU 107 calculates the opening of the ISCV 9, with the result that the ISCV 9 is adjusted dependent upon the calculated opening, which will be explained in more detail later.

Control at steps 303, 305, and 306 is transferred to step 307, thereby terminating the control routine of the ISCV 9 of FIG. 3.

If steps 302 and 303 are not carried out in the routine, as illustrated in FIG. 3, and, accordingly, control is transferred from step 301 directly to step 304, a disadvantage is created. That is, when the engine 1 is being cranked, the engine speed $N_e$ is low so that the value $Q/N_e$ is relatively large. As a result, the determination at step 304 may be affirmative so as to completely close the ISCV 9. However, since the intake-air amount required for starting of the engine 1 is relatively large, the above-mentioned complete closing of the ISCV 9 deteriorates the starting characteristics of the engine 1.

In other words, steps 302 and 303 are helpful in improving the starting characteristics of the engine 1.

Step 306 of FIG. 3 is explained in more detail with reference to FIG. 4. First, control is transferred from a start step 401 to step 402, in which a learning value $D_L$ is read from the B-RAM 109 and is stored in the RAM 110.

Next, at step 403, the CPU 107 determines whether or not the operating parameters of the engine 1 satisfy the feedback condition. For example, the feedback condition is set by one or more of the following conditions:

(1) The output "LL" of the idle-position switch 5 is 1, i.e., the throttle valve 4 is completely closed.

(2) The coolant temperature THW of the coolant-temperature sensor 11 is larger than a predetermined value.

(3) The vehicle-speed data SPD of the vehicle-speed sensor 14 is within a predetermined range.

Note that the feedback condition includes one or more of the items (1), (2), and (3). If the determination at step 403 is YES, control is transferred to steps 404 through 412 while if the determination at step 403 is NO, control is transferred to step 413, in which the output data $D_{out}$ is calculated in an open control.

In more detail, at step 413, a base value is compensated for dependent upon the coolant-temperature data THW and the vehicle-speed data SPD so as to calculate the output data $D_{out}$.

On the contrary, at step 404, the CPU 107 calculates a desired engine speed $N_f$ dependent upon the condition that the shift-position switch 15 is turned on or off, the condition that the air conditioner switch 17 is turned on or off, and the like. For example, if the usual desired engine speed $N_f$ is 700 rpm, the desired engine speed $N_f$ in the case where the air conditioner switch 17 is turned on is 900 rpm.

Next, at step 406, the CPU 107 calculates the difference $\Delta N$ between the current engine speed $N_e$ stored in the RAM 110 and the desired engine speed $N_f$. Then at step 407, the CPU 107 calculates the proportional term $D_p(\Delta N)$ dependent upon the difference $\Delta N$ based upon a one-dimensional map stored in the ROM 111, and at step 408, the CPU 107 calculates the integration term $D_i(\Delta N)$ dependent upon the difference $\Delta N$ based upon a one-dimensional map stored in the ROM 111.

Further, at step 409, the CPU 107 calculates the integrated value $\Sigma D_i$ of the integration term $D_i$, i.e., $\Sigma D_i \to \Sigma D_i + D_i$. Note that at the beginning of feedback control, a learning value stored in the B-RAM 109 is used as the integration term. Then at step 410, the CPU 107 calculates an estimated term $D_t$ for increasing the intake-air amount when the shift-position switch 15 and/or the air conditioner switch 17 is turned on.

At step 411, the CPU 107 calculates an output data $D_{out}$ by using the terms $D_p$, $\Sigma D_i$, and $D_t$ calculated at steps 407, 409, and 410. That is, the CPU 107 calculates $D_{out} \to D_p + \Sigma D_i + D_t$.

At step 412, the CPU 107 renews the learning value $D_L$ to bring the value $D_p + \Sigma D_i$ to the current learning value $D_L$ step by step. The renewed learning value $D_L$ is again stored in the B-RAM 109.

Each control at steps 412 and 413 is transferred to step 414, in which the output data $D_{out}$ is set, via the output interface 112, in the down counter 113. Then control is transferred to step 415, in which the routine of FIG. 4 is terminated.

As was explained hereinbefore, the present invention has an advantage in that a reverse flow of air through the air-bypass passage can be prevented and, in addition, the starting characteristics of the engine are improved since the intake-air amount is increased when the engine is being cranked.

We claim:

1. A method for controlling the amount of intake-air in an internal-combustion engine having a supercharger, an intake-air passage, a throttle valve disposed in said intake-air passage, an air-bypass passage connecting the upstream side of said throttle valve to the downstream side thereof, and a control valve disposed in said air-bypass passage, comprising the steps of:

detecting the amount of air taken into said engine;
   detecting the engine speed;
   determining whether or not said engine is being cranked;
   when said engine is being cranked, completely opening said control valve;
   when said engine is not being cranked, determining whether or not said supercharger is operating dependent upon said intake-air amount and said engine speed;
   when said supercharger is operating, completely closing said control valve;
   when said supercharger is not operating, calculating the opening of said control valve dependent upon said intake-air amount and said engine speed so as to control said control valve dependent upon the calculated opening.

2. A method as set forth in claim 1, wherein said supercharger operation-determining step includes the steps of:

dividing said intake-air amount by said engine speed; and
   determining whether or not the divided intake-air amount is equal to or greater than a predetermined value.

3. An apparatus for controlling the amount of intake air in an internal-combustion engine having a supercharger, an intake-air passage, a throttle valve disposed in said intake-air passage, an air-bypass passage connecting the upstream side of said throttle valve to the downstream side thereof, and a control valve disposed in said air-bypass passage, comprising:

means for detecting the amount of air taken into said engine;
   means for detecting the engine speed;
   means for determining whether or not said engine is being cranked;
   means for completely opening said control valve when said engine is being cranked;
   means for determining whether or not said supercharger is operating dependent upon said intake-air amount and said engine speed when said engine is not being cranked;

means for completely closing said control valve when said supercharger is operating;

means for calculating the opening of said control valve dependent upon said intake-air amount and said engine speed, so as to control said control valve dependent upon the calculated opening, when said supercharger is not operating.

4. An apparatus as set forth in claim 3, wherein said supercharger operation-determining means includes:

means for dividing said intake-air amount by said engine speed; and means for determining whether or not the divided intake-air amount is equal to or greater than a predetermined value.

* * * * *